(12) United States Patent
Ohtsuki et al.

(10) Patent No.: US 8,192,088 B2
(45) Date of Patent: Jun. 5, 2012

(54) WHEEL SUPPORT BEARING ASSEMBLY AND METHOD OF MAKING THE SAME

(75) Inventors: Hisashi Ohtsuki, Iwata (JP); Kikuo Maeda, Kuwana (JP)

(73) Assignee: NTN Corporation, Osaka (JP)

( * ) Notice: Subject to any disclaimer, the term of this patent is extended or adjusted under 35 U.S.C. 154(b) by 471 days.

(21) Appl. No.: 12/449,656

(22) PCT Filed: Feb. 19, 2008

(86) PCT No.: PCT/JP2008/000256
§ 371 (c)(1),
(2), (4) Date: Aug. 20, 2009

(87) PCT Pub. No.: WO2008/102540
PCT Pub. Date: Aug. 28, 2008

(65) Prior Publication Data
US 2010/0002972 A1 Jan. 7, 2010

(30) Foreign Application Priority Data
Feb. 23, 2007 (JP) .................. 2007-043598

(51) Int. Cl.
*F16C 13/00* (2006.01)
(52) U.S. Cl. ....................................... 384/544
(58) Field of Classification Search .............. 384/544, 384/589
See application file for complete search history.

(56) References Cited

U.S. PATENT DOCUMENTS

| | | | | |
|---|---|---|---|---|
| 7,452,136 B2 * | 11/2008 | Hirai et al. | | 384/544 |
| 7,909,517 B2 * | 3/2011 | Ohtsuki et al. | | 384/544 |
| 2002/0068639 A1 | 6/2002 | Tajima et al. | | |
| 2004/0120622 A1 * | 6/2004 | Tajima et al. | | 384/544 |
| 2004/0252927 A1 | 12/2004 | Hirai et al. | | |
| 2009/0016662 A1 * | 1/2009 | Ohtsuki et al. | | 384/544 |

FOREIGN PATENT DOCUMENTS

| | | |
|---|---|---|
| JP | 2002-087008 | 3/2002 |
| JP | 2003-090351 | 3/2003 |
| JP | 2005-003061 | 1/2005 |
| JP | 2006-200700 | 8/2006 |
| JP | 2007-024208 | 2/2007 |

OTHER PUBLICATIONS

International Preliminary Report on Patentability mailed Sep. 11, 2009 in corresponding International Patent Application PCT/JP2008/000256.
International Search Report for PCT/JP2008/000256, mailed May 27, 2008.
Chinese Office Action issued Sep. 27, 2010 in corresponding Chinese Patent Application 20080005508.3.

* cited by examiner

*Primary Examiner* — Thomas R Hannon

(57) ABSTRACT

There is provided a wheel support bearing assembly in which at least one of the outer member (5) and inner member, which includes a wheel mounting flange (10), is, after having been forged, air cooled or thermally refined. The respective rolling surfaces of the outer member (5) and the inner member are hardened to have a predetermined surface hardness. The root radial dimension of the section of a groove bottom arc in the serrations (9) of the hub unit (1) is regulated to a value within the range of 0.2 mm to 0.8 mm.

8 Claims, 4 Drawing Sheets

PRIOR ART

WHEEL SUPPORT BEARING ASSEMBLY AND METHOD OF MAKING THE SAME

CROSS REFERENCE RELATED TO APPLICATIONS

This application claims the benefit under 35 U.S.C. Section 371, of PCT International Application No. PCT/JP2008/000256, filed Feb. 19, 2008, which claimed priority to Japanese application No. 2007-43598, filed Feb. 23, 2007, the entire disclosures of which are incorporated by reference as a part of this application.

BACKGROUND OF THE INVENTION

1. Field of the Invention

The present invention relates to a wheel support bearing assembly for supporting a vehicle wheel of an automotive vehicle such as a motor vehicle rotatably relative to the vehicle body and, also, to a method of manufacturing the same. More particularly, the present invention relates to the wheel support bearing assembly of a kind, in which the strength and the durability of a hub axle unit under a rotational bending condition are increased, and, also, to the method of manufacturing such wheel support bearing assembly.

2. Description of the Prior Art

A wheel support bearing assembly for the motor vehicle is currently available in two types, one for supporting a vehicle driven wheel and the other for supporting a vehicle drive wheel, and there is a variety of designs that can be selected depending on the particular purpose of use. By way of example, a conventional wheel support bearing assembly designed to support the vehicle drive wheel such as shown in FIG. 5 includes, as major components, an inner member 50 made up of an hub unit 51 and an inner ring 52, double row rolling elements 53 and 54, an outer member 55 and a constant velocity universal joint 56 for transmitting an engine power to the hub unit 51. In this type of the bearing assembly for the support of the vehicle drive wheel, a medium carbon steel for application in mechanical structures, such as S53C, is largely employed as a material for the hub unit 51, by which the vehicle wheel (not shown) and a brake rotor 57 are supported, due to the easiness of forging, cutting performance, thermal refinement characteristic or economical efficiency. Reduction in size and weight of the wheel support bearing assembly of the kind discussed above, as well as that of the hub unit 51, contributes considerably to improvement in mileage and traveling stability of the motor vehicle and, therefore, attempts have been made in progress to reduce the wall thickness of a wheel mounting flange 58 integral with the hub unit 51 and/or to employ such wheel mounting flange 58 with a plurality of ribs. On the other hand, along with improvement in performance of the motor vehicle, the load on the bearing assembly has increased. However, the mechanical strength of the hub unit 51 itself is coming close to the fatigue limit of the medium carbon steel that is used as a material for the hub unit 51, and, accordingly, it has now come to be difficult to achieve a further reduction in size and weight and a further increase of the durability.

Particularly in the hub unit 51, where the wall thickness of the wheel mounting flange 58 is to be reduced for the purpose of reducing the weight thereof, rotational bending stresses tend to concentrate on an outboard root portion of the wheel mounting flange 58, that is, a corner area 61 ranging from a brake rotor mounting surface 59 to a cylindrical pilot portion 60 and, accordingly, countermeasure against the stress concentration is required to be taken. In view of this, it may be contemplated to increase the dimension of the corner area 61, that is, the radius of curvature of that corner rear 61 to thereby relieve the generation of the stresses, but this in turn leads to a problem associated with interference with the brake rotor 57 that is fitted to the wheel mounting flange 58. The hub unit for the support of the vehicle drive wheel has a center bore defined therein and also has serrations 64 formed in an inner peripheral surface of the center bore for engagement with complemental serrations formed in a stem portion of the constant velocity universal joint 56. The rotational bending stresses tend to concentrate on a radially inwardly stepped area of the hub unit, on which the inner ring 52 is mounted in contact therewith, and, also, on the serrations 64 on the inner peripheral surface of the center bore and, accordingly, a countermeasure to increase the durability of the serrations 64, which have not been subjected to the induction hardening, is often required.

In view of the foregoing background, the applicant or assignee of the present invention has suggested a wheel support bearing assembly of a type, in which the attempts were made to, without altering the shape and the dimensions of the wheel mounting flange 58, reduce the weight and increase the strength of the hub unit 51. This wheel support bearing assembly is illustrated in FIG. 4 and includes a surface hardened layer 62 formed by means of an induction hardening technique in the corner area 61 of the wheel mounting flange 58 in the hub unit 51. In this way, the corner area 61 of the wheel mounting flange 58, which has hitherto been considered the most fragile area susceptible to the rotational bending fatigue, can be reinforced to a high strength, resulting in increase of the durability of the hub unit 51.

Other than that area, that is, a seal land area a, where a sealing lip (not shown) of the seal mounted on an outboard end portion of the outer member 55 (FIG. 5), and various parts b to d extending from rolling surfaces to the radially inwardly stepped area are formed with a surface hardened layer 63 by means of an induction hardening technique or the like. Also, the serrations 64 formed on the inner peripheral surface of the hub unit 51 are formed with a surface hardened layer 65. Thanks to those surface hardened layers 63 and 65, the rolling fatigue lifetime, the frictional wear resistance and the rotational bending fatigue strength required in those parts a to d can be increased. (See, for example, the Patent Document 1 listed below.)

[Patent Document 1] Japanese Laid-open Patent Publication No. 2002-087008 (Pages 4 and 5, and FIG. 2)

[Patent Document 2] Japanese Laid-open Patent Publication No. 2005-003061

It has been found that although in those conventional wheel support bearing assemblies, formation of the surface hardened layer 62 in the corner area 61 of the wheel mounting flange 58 in the hub unit 51 is effective to increase the strength of the hub unit 51 and, at the same time, to reduce the weight thereof, without altering shape and dimension of the wheel mounting flange 58. However, an unexpected problem tends to arise that the wheel mounting flange 58 comes to be susceptible to deformation under the influence of heat treatment during the induction hardening process, resulting in surface runout of a brake rotor mounting surface 58. Reduction in wall thickness of the wheel mounting flange 58 also constitutes a cause of that tendency. The surface runout referred to above in turn results in brake judder under the influence of wobbling of the brake rotor 57 (FIG. 5), thus leading to reduction in automobile drivability and driving feeling. Therefore, it may be contemplated to eliminate the surface runout by additionally performing a turning process on the brake rotor mounting surface 59 after the heat treatment of the hub unit 51 to compensate for the deformation. However, the presence of a difference in hardness between the corner area 61, which has been hardened, and the brake rotor mounting surface 59, which has not been hardened, involves such a problem that a slight step tends to be formed at the boundary between the brake rotor mounting surface 59 and the surface hardened layer 62 of the corner area 61. Also, formation of the surface hardened layer 65 in the serrations 64 formed in the inner peripheral surface of the hub unit 51 tends to lead to a problem that as a result of thermal deformation of some or all of the serrations 64, a proper clearance (a close fit or a clearance fit) can no longer be secured between the serrations 64 and the mating, complemental serrations in the stem portion of the constant velocity universal joint 56 (FIG. 5).

In order to alleviate the foregoing problems, the applicant or assignee of the present invention has suggested such a method (the Patent Document 2 listed above) that in a wheel support bearing assembly of the type, in which the wheel mounting flange is formed integrally with one of the outer member and the inner member, at least one of the outer and inner members, which has the wheel mounting flange formed therein, is thermally refined. However, demands have been arisen for the hub unit to have the increased strength and durability under rotational bending conditions.

The present invention has been devised to substantially eliminate the various problems and inconveniences inherent in the conventional art and is intended to provide a wheel support bearing assembly, in which the strength and the durability of the hub unit under rotational bending conditions are increased and, at the same time, the weight thereof is reduced without altering the shape and dimension of the wheel mounting flange or without deteriorating the surface runout, and also to provide a method of making such wheel support bearing assembly.

SUMMARY OF THE INVENTION

The wheel support bearing assembly of the present invention is a wheel support bearing assembly of a type including an outer member having an inner periphery formed with double row outer rolling surfaces, an inner member formed with double row inner rolling surfaces opposed to the respective outer rolling surfaces; double row rolling elements rollingly accommodated between the respective rolling surfaces of the outer and inner members; and a wheel mounting flange formed integrally with one of the outer and inner members. At least one of the outer and inner members, which is formed with the wheel mounting flange referred to above, is thermally refined or air cooled after having been forged. The respective rolling surfaces of the outer and inner members are hardened to a predetermined surface hardness. The inner member including a hub unit having an inner diametric portion formed with torque transmitting serrations of an arcuate sectional shape represented by a groove bottom defined between the neighboring serrations. The radius of curvature of the arcuate shape represented by the groove bottom between the neighboring serrations is regulated to a value within the range of 0.2 to 0.8 mm.

According to the above described construction, at least one of the outer member and the inner member, which has the wheel mounting flange, is, after having been forged, air cooled or thermally refined, and the respective rolling surfaces of the outer member and the inner member are hardened to have a predetermined surface hardness and, in particular, the radius of curvature of the groove bottom arc forming the sectional shape of the groove bottom of the serrations, that is, the rounded corner area is regulated to have a value within the range of 0.2 mm to 0.8 mm. A moment load is transmitted from the vehicle wheel to the wheel mounting flange of the wheel support bearing assembly. For this reason, the corner of the brake rotor mounting surface of the wheel mounting flange and the axle portion, where the serrations are formed in the inner diametric portion thereof, undergo an elastic deformation repeatedly. In particular, the axle portion having the inner diametric portion where the serrations are formed undergoes an elastic deformation to assume an arcuate shape in an axial direction and also to assume an elliptical shape in a direction of rotation. The hub unit portion has an inner diametric surface formed in the axial direction with 25 serrated teeth to 35 serrated teeth each being of a sectional shape projecting trapezoidally, which serrated teeth are continued in a direction circumferentially, tensile and compressive stresses act on the joints of those teeth, that is, groove bottoms in the circumferential direction when the inner diametric surface undergoes an elastic deformation.

If the radius of curvature of the rounded corner area at the joint, that is, the groove bottom is smaller than 0.2 mm, the stress will concentrate on this rounded corner area as a result of the elastic deformation of the inner diametric portion, resulting in possible inconveniences. Conversely, if the radius of curvature of the rounded corner area is larger than 0.8 mm, undesirable interference will occur between the outer diametric portions of the complemental serrations provided in the stem portion of the constant velocity universal joint to be coupled and the rounded corner area, that is, the groove bottom, making it impossible to bring the serrations of the hub unit and the complemental serrations into suitable surface contact with each other. In view of this, the complemental serrations fail to be smoothly inserted into the serrations of the hub unit, and also, indentations will be formed. Further, even if the complemental serrations are successfully inserted, the outer diametric portions of the complemental serrations will interfere with the rounded corner area during the drive, resulting in occurrence of the indentations. Therefore, there is the possibility that the stress concentrates on those indentations, accompanied by inconveniences.

In other words, since the radius of curvature of the rounded corner area in the serrations in the hub unit is so regulated to a value within the range of 0.2 mm to 0.8 mm, the stresses tending to concentrate on the joint of the neighboring serrations, that is, the groove bottom between the neighboring serrations can be relieved as a result of the elastic deformation of the inner diametric portion. Thus, the concentration of stresses on the rounded corner area can be relieved, and also undesirable interference of the outer diametric portions of the complemental serrations of the constant velocity universal joint with the rounded corner area can be prevented assuredly, making it possible for the serrations of the hub unit and the complemental serrations to be brought into favorable surface contact with each other. Accordingly, the complemental serrations can smoothly be inserted into the serrations of the hub unit, thereby avoiding generation of indentations during the insertion and the driving. Therefore, the stress concentration resulting from those indentations can be prevented beforehand. Accordingly, the desired bearing lifetime can be secured, and also the strength or durability against the rotational bending fatigue can be increased while keeping the existing processing method and existing equipments, but without altering the shape and dimension of the wheel mounting flange.

In the present invention, the inner member may include the hub unit formed with the wheel mounting flange and an inner ring press-fitted onto the hub unit. The inner rolling surface opposed to one of the outer rolling surfaces formed in the outer member is formed directly in an outer peripheral surface of the hub unit. The inner rolling surface opposed to the other of the outer rolling surfaces is formed in an outer peripheral surface of the inner ring. In such case, the wheel support bearing assembly can have a reduced size and a reduced weight, and the strength and the durability of the hub unit can also be further increased as compared with those of the conventional counterpart.

In the present invention, an outboard root portion of the wheel mounting flange preferably has a surface hardness set to a value within the range of 20 HRC to 35 HRC. In such case, the processability such as cutting can be increased, and the deformation during the heat treatment can also be suppressed, thereby avoiding deterioration of the surface runout precision of the brake rotor mounting surface of the wheel mounting flange resulting from the deformation during the heat treatment. Also, the possibility can be avoided that the surface hardness of the bolt holes, into which the hub bolts are press fitted, approach the surface hardness of the hub bolts so that some or all of the serrations of the hub bolts will be crushed enough to lower the fixing strength.

In the present invention, an inboard end of the hub unit may be plastically deformed in a direction radially outwardly thereof to form a crimped portion and the inner ring is axially fixed by this crimped portion relative to the hub unit. In this case, since there is no need to control the amount of preload by firmly fastening with nuts or the like as has hitherto been practiced, incorporation into the automotive vehicle can be simplified and the amount of preload can be maintained for an extended length of time.

In the present invention, the crimped portion is preferably tempered to have a surface hardness within the range of 20 HRC to 25 HRC. In this case, as compared with a forged but not heat-treated portion such as in the conventional case, variation in hardness of the crimped portion can be suppressed and, without lowering the processability, the possibility of occurrence of fine cracks in the surface due to the plastic processing can be eliminated, resulting in further increase of the reliability in quality.

In the present invention, outboard and inboard sealing elements are preferably disposed at opposed ends of the outer member, respectively, and a seal land area, with which a sealing lip of the outboard sealing element is slidingly engaged, is formed in an inboard root portion of the wheel mounting flange, the seal land area having a surface hardness set to a value within the range of 54 HRC to 64 HRC. In this case, the frictional wear resistance can be increased, and also the mechanical strength can be sufficiently increased against the rotational bending load on the wheel mounting flange and the strength and the durability of the hub unit can also be increased.

In the present invention, the inner member or the outer member, which has the wheel mounting flange, is preferably made of a medium carbon steel containing carbon in a quantity within the range of 0.40 wt % to 0.80 wt %. In this case, this is particularly advantageous in terms of the easiness of forging, cutting performance, thermal refinement characteristic or economical efficiency and, also, this is particularly suitable in an induction hardening or the like.

Also, a method of manufacturing a wheel support bearing assembly according to the present invention includes the steps of air cooling or thermally refining at least one of the outer and inner members, which is formed with the wheel mounting flange, after having forged it; hardening the rolling surfaces of the outer and inner members to have a predetermined surface hardness; forming the serrations in the inner diametric portion of the hub unit for transmission of torque, the serrations having a sectional shape of a groove bottom delimited between the neighboring serrations, which represents an arcuate shape; and regulating the radius of curvature of the arc depicted by the groove bottom, forming the sectional shape of the groove bottom of the serrations, to a value within the range of 0.2 mm to 0.8 mm.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
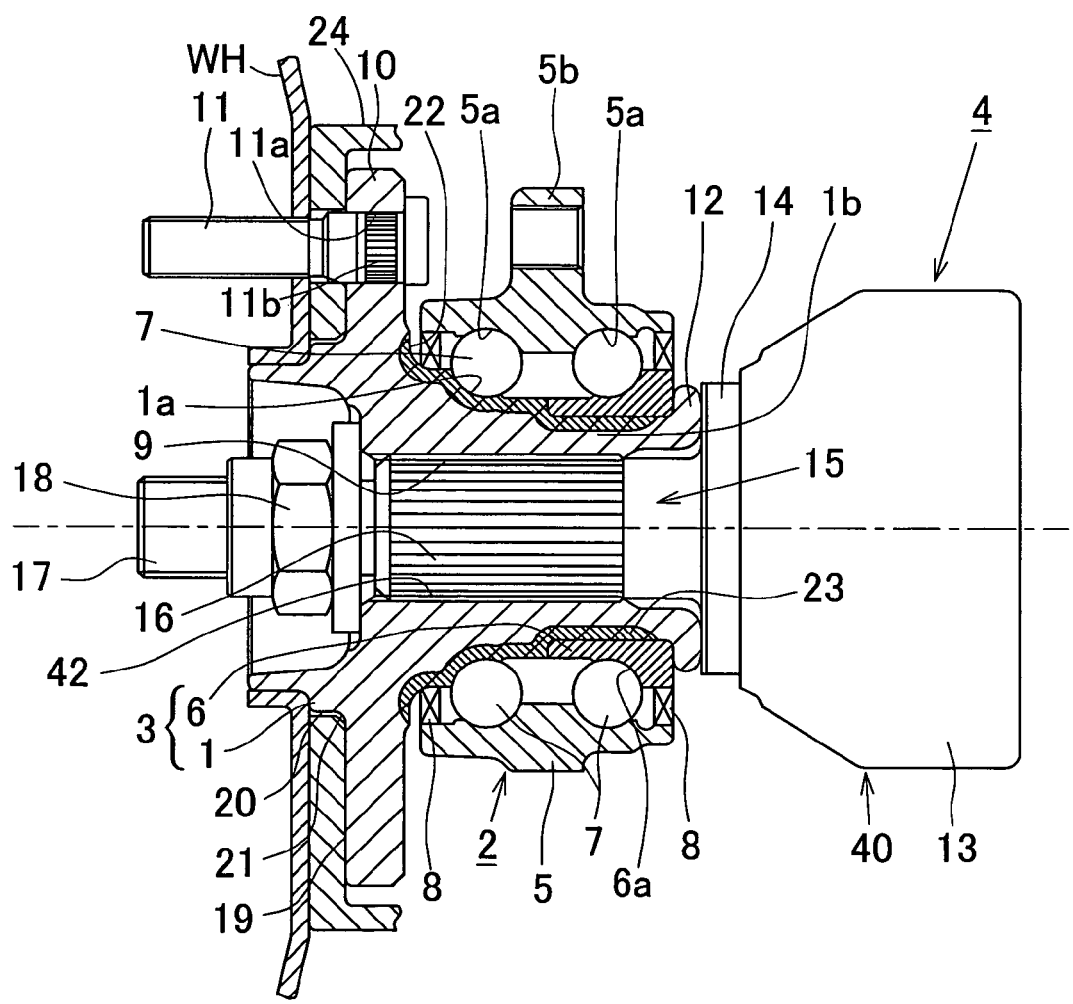
FIG. 1 is a sectional view of a wheel support bearing assembly according to a first preferred embodiment of the present invention.
Figure 2A:
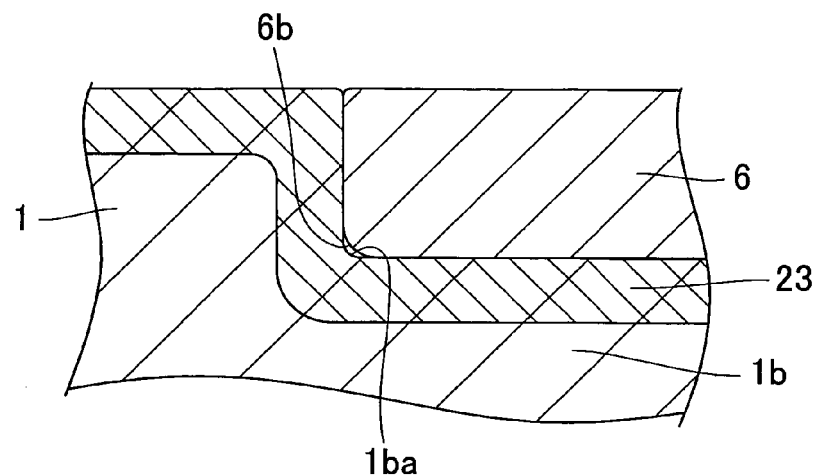
FIG. 2A is an enlarged sectional view showing the relation between a chamfer of an inner ring and a rounded corner area in the wheel support bearing assembly.
Figure 2B:
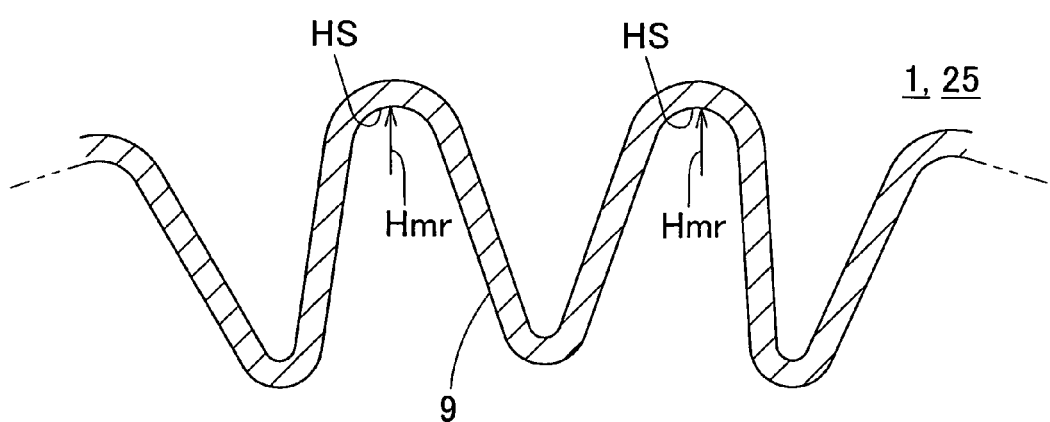
FIG. 2B is an enlarged view showing some of serrations of a hub unit in the wheel support bearing assembly.

Preferred embodiments of the present invention will now be described in detail with reference to the accompanying drawings. FIG. 1 illustrates a sectional view of a wheel support bearing assembly according to the first preferred embodiment of the present invention. FIG. 2A is an enlarged sectional view showing the relation between a chamfer of an inner ring and a rounded corner area in the wheel support bearing assembly and FIG. 2B is an enlarged view showing some of serrations of a hub unit in the wheel support bearing assembly. It is to be noted that hereinafter in this specification, terms "outboard" and "inboard" represent one side (a left side as viewed in the drawings) of the vehicle body away from the longitudinal center of the vehicle body and the other side (a right side as viewed in the drawings) of the vehicle body close to the longitudinal center of the vehicle body, respectively, when assembled in the vehicle body. The following description includes a description of a method of manufacturing a wheel support bearing assembly.

The wheel support bearing assembly referred to above is of a type used for the support of a vehicle drive wheel and is so designed and includes a hub unit 1, a double row rolling bearing unit 2 unitized together with the hub unit 1 into a unitary structure and a constant velocity universal joint 4 having an outer coupling member 40 mounted on an inner periphery of the hub unit 1 by means of serrations for torque transmission.

The wheel support bearing assembly includes an outer member 5 having an inner periphery formed with double row outer rolling surfaces 5a and 5a and also having an outer periphery formed integrally with a vehicle body fitting flange 5b adapted to be secured to a vehicle body (not shown). The bearing assembly also includes the hub unit 1 having an outer periphery formed with one of inner rolling surfaces opposed to the respective outer rolling surfaces 5a and 5a, that is, an inner rolling surface 1a, an inner ring 6 press fitted onto a radially inwardly stepped area 1b of the hub unit 1 and having its outer periphery formed with the other of the inner rolling surfaces, that is, an inner rolling surface 6a, and a plurality of rows of rolling elements 7 and 7 accommodated between the outer rolling surfaces 5a and 5a and the inner rolling surfaces 1a and 6a. The double row rolling elements 7 and 7 are rollingly retained by respective retainers (not shown). The hub unit 1 and the inner ring 6 cooperate with each other to define an inner member 3. Also, sealing elements 8 and 8 are mounted in opposed ends of the double row rolling bearing unit 2 to avoid leakage of a lubricant grease, filled inside the interior of the bearing unit, and also to avoid ingress of rain water and/or dust from the outside. A seal land area 22, with which a sealing lip of the outboard sealing element 8 is slidingly engaged, is formed in an inboard root portion of the wheel mounting flange 10.

The hub unit 1 has an insertion hole 42 defined in a center portion thereof and also has an inner periphery formed with torque transmitting serrations (or spline grooves or projections) 9 and is formed integrally with a wheel mounting flange 10 on an outer periphery of an outboard end thereof for supporting a vehicle wheel WH together with a brake rotor 24 for rotation together therewith. The serrations 9 on the hub unit 1 has a groove bottom HS defined between the neighboring serrations 9 as shown in FIG. 2B, which bottom HS has a sectional shape representing an arcuate shape, that is, a rounded corner. The radius of curvature Hmr for the arc of the sectional shape of the groove bottom HS between the neighboring serrations 9, that is, the rounded corner is regulated to a value within the range of 0.2 to 0.8 mm. Also, as shown in FIG. 1, a plurality of hub bolts 11 for fixedly retaining the vehicle wheel are secured to the wheel mounting flange 10 in a fashion spaced equidistantly from each other in a direction circumferentially of the flange 10.

In this wheel support bearing assembly, after the inner ring 6, which is a separate member, has been press fitted onto the radially inwardly stepped area 1b of the hub unit 1, a free end of the radially inwardly stepped area 1b is plastically deformed in a direction radially outwardly thereof to form a crimped portion 12, by which the inner ring 6 is axially anchored to the hub unit 1, thereby unitizing the double row rolling bearing unit 2 and the hub unit 1 together in a unitary structure. By this unitization, it is possible to provide a third generation type wheel support bearing assembly of a so-called self-retained structure, with which a preload control of the double row rolling bearing unit 2 can be achieved without fastening members such as, for example, an anchoring nut. Although in the foregoing description reference has been made to the dual row angular contact ball bearing employing balls for the rolling elements 7 and 7, the present invention is not necessarily limited thereto and can be equally applied to a double row tapered roller bearing utilizing tapered rollers for the rolling elements.

The constant velocity universal joint 4 includes, in addition to the outer coupling member 40 referred to hereinabove, an inner coupling member (not shown), torque transmitting balls accommodated between the inner coupling member and the outer coupling member 40, and a ball cage for retaining the torque transmitting balls in a fashion spaced equidistantly from each other in a circumferential direction thereof. The outer coupling member 40 includes a cup-shaped mouth portion 13, a shoulder portion 14 defining a bottom of the mouth portion 13 and a stem portion 15 extending axially from the shoulder portion 14. The stem portion 15 has an outer peripheral surface formed with complemental serrations 16 and also has a free end portion formed with a male thread 17.

By inserting the stem portion 15 of the outer coupling member 40 into the insertion hole 42 defined in the hub unit 1 with the serrations 9 in the hub unit 1 engaged with the complemental serrations 16 in the stem portion 15, the torque can be transmitted therebetween. Then, while an end face of the shoulder portion 14 is brought into contact with the crimped portion 12 of the hub unit 1, an anchoring nut 18 is firmly threaded onto the free end of the stem portion 15 to removably connect the constant velocity universal joint 4 with the double row rolling bearing unit 2.

In the wheel support bearing assembly of the construction described hereinabove, the hub unit 1 is, after a medium carbon steel such as, for example, S53C containing carbon in a quantity within the range of 0.40 wt % to 0.80 wt % as stipulated in the Japanese Industrial Standards (or JIS for short) has been hot forged, thermally refined or air cooled to have a grain size rated number 8 or higher and is subsequently turned to have a predetermined shape and dimensions. An area of the root portion of the wheel mounting flange 10 on the outboard side, that is the corner area 21 ranging from an outboard end surface of the wheel mounting flange 10, that is, a brake rotor mounting surface 19 to a cylindrical pilot portion 20 defining a support face for the brake rotor 24 is formed to represent an arcuate surface or recess portion having a radius of curvature enough to avoid interference with the brake rotor 24. Also, as best shown in FIG. 2A, a rounded corner area 1ba is formed in the radially inwardly stepped area 1b of an axle area of the hub unit 1 and so shaped as to avoid interference with a chamfered region 6b of the inner ring 6. As shown in FIG. 1, an outer peripheral surface of the axle portion of the hub unit 1 is formed with the seal land area 22, the inner rolling surface 1a, an outer diametric portion of the radially inwardly stepped area 1b, and a rounded corner area 1ba by being ground simultaneously.

In the embodiment under discussion, the hub unit 1 is, after having been hot forged, for example, at a temperature within the range of 1,050° C. to 1,300° C., subjected to a so-called thermal refinement, in which the hub unit 1 is allowed to stand to cool down to room temperature, followed by tempering at a temperature equal to or higher than 400° C. (preferably, hardening for a holding time within the range of 1 to 3 hours at a temperature within the range of 800° C. to 900° C.→air cooling→tempering for a holding time within the range of 1 to 3 hours at a temperature within the range of 400° C. to 700° C.), to thereby obtain a troostite structure or a sorbite structure. By this thermal refinement, the structure is granulated to the grain size equal to or higher than number 8 and mechanical characteristics such as tensile strength, bending strength and impact strength are so improved as to result in enhanced ductility and toughness. The grain size referred to above is analogous to the size of crystalline particles found during microscopic examination of cross section and is expressed by the grain size number N determined by a comparison method or an intercept method. This identification grain size number N is stipulated according to JIS G0551 or ISO 6431. The grain size number N is based on the number m of crystalline particles observed on 1 mm$^2$ section of the object at a magnification ratio of 100 and follows the definition, $m=8\times2^N$.

Although increase of the surface hardness results in increase of the mechanical strength as hereinabove described, in the practice of the present invention the surface hardness after the thermal refinement is set to be within the range of 20

HRC to 35 HRC. The reason for the selection of the surface hardness within this prescribed range is because if the surface hardness is set to be higher than 35 HRC, a machinability or cutting performance will be lowered due to increase in surface hardness, accompanied by not only reduction in service lives of a cutting tool bit and a broaching tool but also deterioration of the surface runout precision of the brake rotor mounting surface 19 of the wheel mounting flange 10 and the precision of the serrations. Also, the surface hardness of bolt holes 11a for receiving the hub bolts 11 press-fitted thereto comes close to the surface hardness of the hub bolts 11 so that some or all of the serrations 11b of the hub bolts 11 will be crushed enough to lower the fixing strength.

In addition, while the crimped portion 12 referred to hereinbefore is formed, if the surface hardness of the inboard end portion of the hub unit 1 exceeds the upper limit of 35 HRC, not only will the processability be lowered, but also there is a risk that due to plastic forming, fine cracks will occur in the surface, accompanied by reduction in reliability of the quality. Although in terms of the plastic forming the surface hardness should be rather low, sufficient mechanical strength is difficult to obtain if it is lower than the lower limit of 20 HRC. The reliability will increase provided that in the crimped portion 12 the surface hardness thereof is chosen to be within the range of 20 HRC to 35 HRC and preferably within the range of 20 HRC to 25 HRC.

As hereinabove described, after the hub unit 1 has been forged, the grain size is increased to a value equal to or higher than number 8 by means of, for example, the thermal refining is performed to obtain the desired surface hardness and, also, when the radial dimension of the tooth root (See, JIS B 1603, "Involute Spline, Tooth Flank Alignment, General Items, Specification and Inspection".) of the groove bottom arc defining the sectional shape of the groove bottom HS between the neighboring serrations 9 of the hub unit 1, that is, the radius of curvature Hmr is regulated to a value within the range of 0.2 mm to 0.8 mm. With these two steps, the following functions and effects can be obtained.

If the radius of curvature Hmr of the rounded corner area is smaller than 0.2 mm, elastic deformation of an inner diametric portion of the hub unit concentrates something on a joint between the neighboring teeth, that is, the groove bottom, resulting in the possible inconveniences. Conversely, if the radial dimension of the rounded corner area is greater than 0.8 mm, undesirable interference will occur between the outer diametric portions of the complemental serrations 16 of the constant velocity universal joint 13 to be coupled and the rounded corner area, that is, the groove bottom HS, making it impossible to bring the serrations 9 of the hub unit 1 and the previously described complemental serrations 16 into a suitable surface contact with each other. In view of this, the complemental serrations 16 fail to be smoothly inserted into the serrations 9 of the hub unit 1, and also indentations will be formed. Therefore, there is the possibility that the stress concentrates on those indentations, accompanied by inconveniences.

In the illustrated embodiment, since the radius of curvature Hmr of the rounded corner area of the serrations 9 in the hub unit 1 is regulated to a value equal to or greater than 20 mm, the stress tending to concentrate on the joint between the neighboring serrations 9, that is, the groove bottom between the neighboring serrations 9 as a result of the elastic deformation of the hub unit inner diametric portion can be relieved. Along therewith, since the radius of curvature of the corner R of the serrations 9 is restricted to a value equal to or smaller than 0.8 mm, undesirable interference of the outer diametric portions of the complemental serrations 16 of the constant velocity universal joint 13 with the rounded corner area, that is, the groove bottom HS can be prevented assuredly, making it possible for the serrations 9 of the hub unit 1 and the complemental serrations 16 to be brought into favorable surface contact with each other. Accordingly, the complemental serrations 16 can smoothly be inserted into the serrations 9 of the hub unit 1, thereby avoiding generation of indentations during the insertion and the driving. Therefore, the stress concentration resulting from those indentations can be prevented beforehand.

Accordingly, without altering the shape and dimension of the wheel mounting flange 10 and the wall thickness of the axle portion, the strength of the corner area 21, which forms the most fragile portion susceptible to rotational bending fatigue, and the strength of the axle portion can be increased while keeping the existing processing method and existing equipments. Also, when the turning process is performed subsequent to forging and thermal refinement, the surface runout precision of the brake rotor mounting surface 19 of the wheel mounting flange 10 can be further improved as compared with that in the conventional counterpart. In addition, in the crimped portion 12, occurrence of cracking can be suppressed without the processability during the plastic forming being reduced, thus allowing the reliability in quality to be maintained.

Although the thermal refinement of the hub unit 1 that is performed subsequent to the forging has been described as applied over the entire surface inside a thermal refining furnace, the present invention is not limited thereto and a partial thermal refinement may be performed, in which, after the cutting process, only the corner area 21 of the wheel mounting flange 10, the inner diametric serrations, and the inboard end portion of the hub unit 1 corresponding to the crimped portion 12 are heated by means of a high frequency to cause them to achieve a desired surface hardness. In such case, there is no need to consider the processability such as, for example, cutting and a predetermined site can be set to have a suitably desired surface hardness. For example, the corner area 21 of the wheel mounting flange 10 and the inner diametric portion including the serrations 9 may have a surface hardness within the range of 20 HRC to 40 HRC, or the crimped portion 12 may have a surface hardness within the range of 20 HRC to 25 HRC.

Also, the hub unit 1 is such that the inner rolling surface 1a on the outboard side, the seal land area 22 where the sealing element 8 undergoes a sliding contact, and the radially inwardly stepped area 1b are formed, respectively, with a hardened layer 23 (shown by cross hatchings in the drawing) of a surface hardness within the range of 54 HRC to 64 HRC by means of an induction hardening process. Accordingly, the seal land area 22 can have an increased frictional wear resistance and also a sufficient mechanical strength against the rotational bending load on the wheel mounting flange 10, with the durability of the hub unit 1 being increased consequently. The inner ring 6 that is press-fitted onto the radially inwardly stepped area 1b is made of a high-carbon chromium bearing steel such as, for example, SUJ2 stipulated according to the JIS and is hardened deep down to the core by means of a dip quenching technique to have a hardness within the range of 58 HRC to 64 HRC.

On the other hand, the outer member 5 is made of a medium carbon steel such as, for example, S53C containing carbon within the range of 0.40 wt % to 80 wt % as is the case with the hub unit 1 and the double row outer rolling surfaces 5a and 5a and the end inner diametric surface, in which the sealing elements 8 and 8 are engaged, are hardened by means of an induction hardening process to have a surface hardness within the range of 54 HRC to 64 HRC.

In the description given hereinabove, the method of making the hub unit 1 has been shown and described as including the steps of hot forging→thermal refinement→primary turning (the step of turning the hot forged product of the hub unit to a shape closely similar to the final shape of the hub unit) and bolt hole forming→induction hardening→secondary turning (the step of finally turning the brake rotor mounting surface 19 of the wheel mounting flange 10, the inner diametric portion and the like)→broaching work. However, the present invention is not limited thereto and may include the steps of hot forging→thermal refinement→turning and bolt hole forming→induction hardening→broaching work or, alternatively, hot forging→turning and bolt hole forming→broaching work→induction hardening. Thus, the efficiency of work can be improved depending on the arrangement of the manufacturing line. By way of example, in place of the step of thermal refinement, after the forging of the hub unit 1, to set the desired surface hardness, a step of air cooling after the forging of the hub unit 1 to set the desired surface hardness and to regulate the radius of curvature Hmr of the arc of the groove bottom forming the sectional shape of the groove bottom HS in the serrations 9 of the hub unit 1 within the range of 0.2 mm to 0.8 mm may be employed. Even in this case, effects and advantages similar to those afforded by the foregoing embodiment of the present invention can be obtained.

Moreover, in order to enhance the durability, a shot peening process SP may be applied to the corner area 21 of the brake rotor mounting surface 19 and the inner diametric portion that includes the serrations 9, subsequent to the previously described processing.

The shot peening process SP referred to above is one of the cold working processes, in which small, but hard globules ranging from about 10 μm to about 1.3 mm in size, which are generally referred to as shots, are hurled by a shooting machine onto the work (to-be-processed article or site) at a high velocity so that a surface region of the work can be hardened and residual compressive stresses can be generated. In recent years, a wide peening cleaning (WPC) process and a fine particle peening (FPP) process have come to be available and are different from the shot peening process, but in the broad sense those WPC and FPP processes can generally be included within the shot peening process. Accordingly, in the practice of the present invention, any of those WPC and FPP processes is to be construed as included within the term "shot peening process".

For example, when a so-called nozzle type shot peening process is employed, while the hub unit 1 is rotated with a shooting nozzle disposed against the inboard inner diametric surface of the hub unit 1, steel globules of size within the range of 30 μm to 80 μm are hurled under a pressure within the range of 0.3 MP to 0.5 MP for duration of the range of 10 to 30 seconds onto the inboard inner diametric surface of the hub unit 1. By this process, the surface region can be hardened to a surface hardness within the range of 24 HRC to 40 HRC and the residual compressive stress of 400 MPa to 600 MPa can be generated, with the durability of the hub unit 1 being increased consequently.

Figure 3:
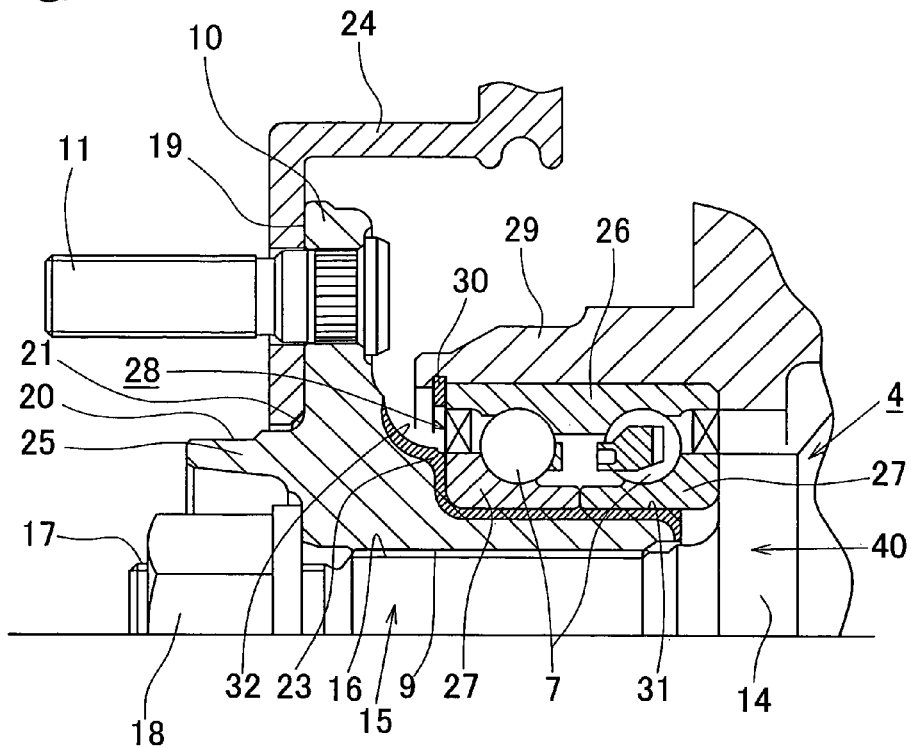
FIG. 3 is a sectional view of the wheel support bearing assembly according to a second preferred embodiment of the present invention.
Figure 4:
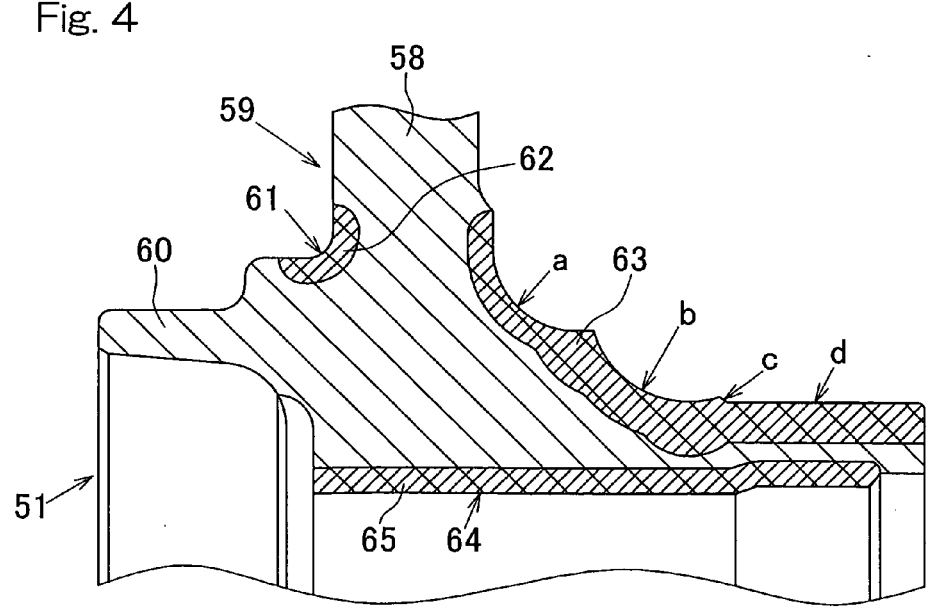
FIG. 4 is a sectional view showing a hub unit of a conventional wheel support bearing assembly.
Figure 5:
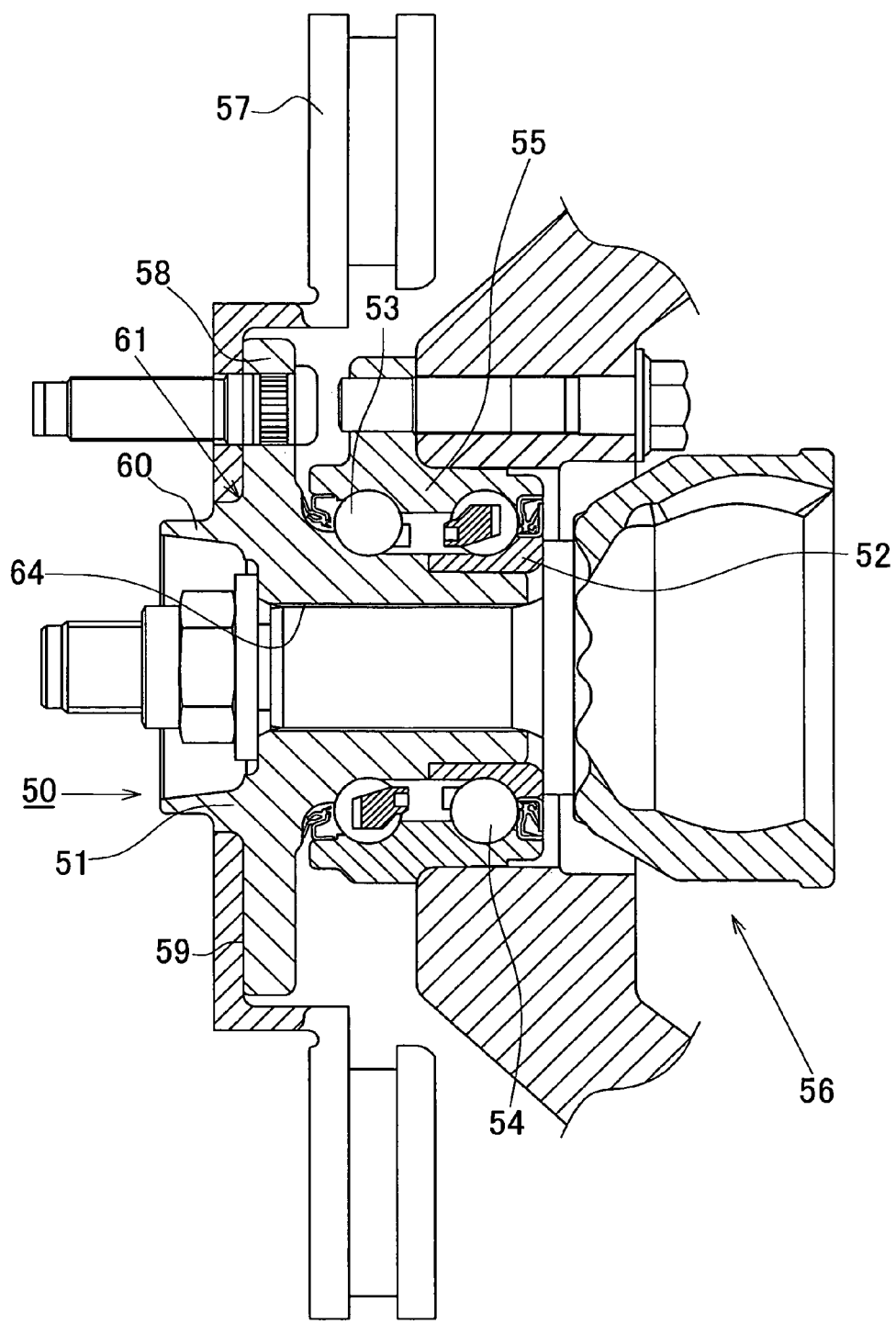
FIG. 5 is a sectional view showing another conventional wheel support bearing assembly.

FIG. 3 illustrates a sectional view of the wheel support bearing assembly according to a second preferred embodiment of the present invention. This second embodiment is applied to the wheel support bearing assembly of the first generation type. In the description that follows, component parts similar to those shown and described in connection with the previously described embodiment including modifications thereof are designated by like reference numerals and the details thereof will not be reiterated for the sake of brevity. Where only some portions are described, other portions than those described are to be understood as similar to those shown and described in connection with the previously described embodiment. Also, in the practice of the present invention, not only combinations of parts shown and described in connection with the previously described embodiment, but also partial combinations of the various embodiments can be contemplated where possible.

A wheel support bearing assembly according to the second embodiment includes a hub unit 25, to which a vehicle wheel (not shown) is fitted together with a brake rotor 24, and a wheel support bearing unit 28 for rotatably supporting the hub unit 25 and having an outer ring 26, a pair of inner rings 27 and 27 arranged in an axial direction, and double row rolling elements 7 and 7 rollingly accommodated between the inner and outer rings 27 and 26. This bearing unit 28 is fitted to a knuckle 29 of the automotive vehicle and is drivingly coupled with a constant velocity universal joint 4 for transmitting the drive of a drive shaft (not shown) to the hub unit 25. In the illustrated instance, although a double row angular contact bearing employing balls for the rolling elements 7 and 7 has been shown, the present invention is not necessarily limited thereto and can be applied to a double row tapered roller bearing utilizing tapered rollers for the rolling elements.

The outer ring 26 of the wheel support bearing unit 28 is mounted inside the knuckle 29 and axially fixedly positioned by means of a stop ring 30. On the other hand, the pair of the inner rings 27 and 27 are press-fitted onto a radially inwardly stepped area 31 of a cylindrical configuration formed in the hub unit 25 and the constant velocity universal joint 4 is separably coupled with the hub unit 25 when while a large diameter side end face of the inner ring 27 on the inboard side is brought into abutment with a shoulder 14 of the outer coupling member 40 a free end of the stem portion 15 is fastened by an anchoring nut 18.

In this wheel support bearing assembly, the hub unit 25 is, after a medium carbon steel such as, for example, S53C, containing carbon in a quantity within the range of 0.40 wt % to 0.80 wt %, has been hot forged, thermally refined in its entirety to have a grain size rated number 8 or higher, with the surface hardness consequently set to a value within the range of 20 HRC to 35 HRC. As described above, when the hub unit 25 is thermally refined, after the forging, to have the grain size equal to or higher than number 8 with the surface hardness thereof set to a desired value, and as shown in FIG. 2B the radius of curvature Hmr of the groove bottom arc forming the sectional shape of the groove bottom HS between the neighboring serrations in the inner diametric portion of the hub unit 25 is regulated to a value within the range of 0.2 mm to 0.8 mm. Accordingly, the strength of the corner area 21, which forms the most fragile portion susceptible to rotational bending fatigue, and the strength of the axle portion can be increased without altering the shape and dimension of the wheel mounting flange 10.

Also, an inboard root portion 32 of the wheel mounting flange 10 in the hub unit 25 is so designed that as is the case with the inboard root portion 22 shown and described in connection with the first embodiment of the present invention, the radius of curvature thereof is set to a value as large as possible and a region ranging from this root portion 32 to the radially inwardly stepped area 31 is hardened by an induction hardening technique to obtain a hardened layer 23 (shown by the cross hatched area in the drawing) having a surface hardness within the range of 54 HRC to 64 HRC. Thanks to this construction, a sufficient mechanical strength is provided against the rotational bending load on the wheel mounting flange 10 and the durability of the hub unit 25 can be increased consequently.

The pair of the inner rings 27 and 27 that are press-fitted onto the radially inwardly stepped area 31 are made of a high carbon and chromium bearing steel such as, for example, SUJ2 and are hardened deep down to the core by means of a dip quenching technique to have a hardness within the range of 58 HRC to 64 HRC. In view of the fact that the predetermined hardened layer 23 is formed in this radially inwardly stepped area 31, the fretting abrasion, which would occur between the radially inwardly stepped area 31 and the inner races 27 and 27, is suppressed effectively. As a consequence, the possibility of the inner rings 27 and 27 being damaged due to rusting, frictional wear and/or galling occurring at the surface of mounting of the inner rings 27 and 27 because of the fretting abrasion discussed above, can be eliminated with the durability being increased consequently.

It is to be noted that as far as the surface of each of the serrations 9 formed in the inner peripheral surface of the hub unit 25 is concerned, the strength of the corner area 21, which forms the most fragile portion susceptible to rotational bending fatigue, and the strength of the axle portion can be increased without altering the shape and dimension of the wheel mounting flange 10 and the radius of curvature Hmr of the rounded corner areas of the serrations 9 is at the same time regulated to a value equal to or larger than 0.2 mm as is the case with that shown and described with particular reference to FIG. 2B. Accordingly, the stresses tending to concentrate on the joint of the neighboring serrations 9, that is, the groove bottom between the neighboring serrations 9 can be relieved as a result of the elastic deformation of the hub unit inner diametric portion can be relieved. Along therewith, since the radius dimension of the rounded corner area in the serrations 9 is so regulated to a value equal to or smaller than 0.8 mm, undesirable interference of the outer diametric portions of the complemental serrations 16 of the constant velocity universal joint 13 with the rounded corner area, that is, the groove bottom HS can be prevented assuredly, making it possible for the serrations 9 of the hub unit 1 and the complemental serrations 16 to be brought into favorable surface contact with each other. Accordingly, the complemental serrations 16 can smoothly be inserted into the serrations 9 of the hub unit 1, thereby avoiding generation of indentations during the insertion and the driving. Therefore, the stress concentration resulting from those indentations can be prevented beforehand and the strength of the corner area 21, which forms the most fragile portion susceptible to rotational bending fatigue, and the strength of the axle portion can be increased without altering the shape and dimension of the wheel mounting flange 10, thereby contributing to reduction in size and weight of the hub unit 25. On the other hand, the outer ring 26 is, as is the case with the inner ring 27, made of a high carbon chromium bearing steel such as, for example, SUJ2 and is hardened deep down to the core by means of the dip quenching technique to have a hardness within the range of 54 HRC to 64 HRC. According to the wheel support bearing assembly shown in and described with reference to FIG. 3, effects similar to those afforded by the wheel support bearing assembly shown in and described with reference to FIG. 1 can be obtained.

Although the present invention has been fully described in connection with the preferred embodiments thereof, they are only for the purpose of illustration and numerous changes and modifications can be achieved without departing from the gist of the present invention, the scope of the present invention is to be construed based on the appended claims and encompasses meanings of equivalents set forth in the appended claims and, also, changes and modification within the scope thereof.

What is claimed is:

1. A wheel support bearing assembly which comprises:
    an outer member having an inner periphery formed with double row outer rolling surfaces,
    an inner member formed with double row inner rolling surfaces opposed to the respective outer rolling surfaces;
    double row rolling elements rollingly accommodated between the respective rolling surfaces of the outer and inner members; and
    a wheel mounting flange formed integrally with one of the outer and inner members;
    wherein at least one of the outer and inner members, which is formed with the wheel mounting flange referred to above, is thermally refined or air cooled after having been forged; the respective rolling surfaces of the outer and inner members are hardened to a predetermined surface hardness; the inner member including a hub unit having an inner diametric portion formed with torque transmitting serrations of an arcuate sectional shape represented by a groove bottom defined between the neighboring serrations; and the radius of curvature of the arcuate shape represented by the groove bottom between the neighboring serrations is regulated to a value within the range of 0.2 to 0.8 mm.

2. The wheel support bearing assembly as claimed in claim 1, wherein the inner member includes the hub unit formed with the wheel mounting flange and an inner ring press-fitted onto the hub unit; the inner rolling surface opposed to one of the outer rolling surfaces formed in the outer member is formed directly in an outer peripheral surface of the hub unit; and the inner rolling surface opposed to the other of the outer rolling surfaces is formed in an outer peripheral surface of the inner ring.

3. The wheel support bearing assembly as claimed in claim 2, wherein an inboard end of the hub unit is plastically deformed in a direction radially outwardly thereof to form a crimped portion and the inner ring is axially fixed by this crimped portion relative to the hub unit.

4. The wheel support bearing assembly as claimed in claim 3, wherein the crimped portion is tempered to have a surface hardness within the range of 20 HRC to 25 HRC.

5. The wheel support bearing assembly as claimed in claim 2, wherein outboard and inboard sealing elements are disposed at opposed ends of the outer member, respectively, and a seal land area, with which a sealing lip of the outboard sealing element is slidingly engaged, is formed in an inboard root portion of the wheel mounting flange, the seal land area having a surface hardness set to a value within the range of 54 HRC to 64 HRC.

6. The wheel support bearing assembly as claimed in claim 1, wherein an outboard root portion of the wheel mounting flange has a surface hardness set to a value within the range of 20 HRC to 35 HRC.

7. The wheel support bearing assembly as claimed in claim 1, wherein the inner member or the outer member, which has the wheel mounting flange, is made of a medium carbon steel containing carbon in a quantity within the range of 0.40 wt % to 0.80 wt %.

8. A method of manufacturing the wheel support bearing assembly as defined in claim 1, which comprises the steps of:
    air cooling or thermally refining at least one of the outer and inner members, which is formed with the wheel mounting flange, after having forged it;

hardening the rolling surfaces of the outer and inner members to have a predetermined surface hardness;

forming the serrations in the inner diametric portion of the hub unit for transmission of torque, the serrations having a sectional shape of a groove bottom delimited between the neighboring serrations, which represents an arcuate shape; and regulating the radius of curvature of the arc depicted by the groove bottom, forming the sectional shape of the groove bottom of the serrations, to a value within the range of 0.2 mm to 0.8 mm.

* * * * *